US012711119B2

(12) United States Patent
Heidarikhazaei et al.

(10) Patent No.: US 12,711,119 B2
(45) Date of Patent: Aug. 18, 2026

(54) METHODS AND SYSTEMS FOR EFFICIENT LEARNED INDEX ON LOG-STRUCTURED MERGE-TREE KV-STORES

(71) Applicant: Huawei Cloud Computing Technologies Co., Ltd., Gui'an New District (CN)

(72) Inventors: Alireza Heidarikhazaei, Burnaby (CA); Amirhossein Ahmadi, Burnaby (CA); Wei Zhang, Burnaby (CA)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 0 days.

(21) Appl. No.: 18/971,790

(22) Filed: Dec. 6, 2024

(65) Prior Publication Data

US 2026/0161625 A1 Jun. 11, 2026

(51) Int. Cl.
*G06F 16/22* (2019.01)

(52) U.S. Cl.
CPC ................................ *G06F 16/2246* (2019.01)

(58) Field of Classification Search
CPC .................................................. G06F 16/2246
See application file for complete search history.

(56) References Cited

U.S. PATENT DOCUMENTS

2022/0245113 A1* 8/2022 Agrawal ............. G06F 16/2264
2022/0382760 A1* 12/2022 Pang ................... G06F 16/2246
2024/0220470 A1* 7/2024 Chen ................... G06F 16/2246
2025/0139272 A1* 5/2025 Moon ..................... G06F 21/62
2025/0328445 A1* 10/2025 Oswal ................. G06F 11/3414

FOREIGN PATENT DOCUMENTS

CN 116382588 A 7/2023
CN 117389950 A 1/2024

OTHER PUBLICATIONS

Cao et al., Characterizing, modeling, and benchmarking rocksdb key-value workloads at facebook, In Proceedings of the 18th USENIX Conference on File and Storage Technologies (USA, 2020), FAST'20, Usenix Association, p. 209-224.

(Continued)

*Primary Examiner* — Huawen A Peng
(74) *Attorney, Agent, or Firm* — BCF LLP

(57) ABSTRACT

A method and a system for double-objective learned indexing in a key-value store is disclosed. The key-value store is a log-structured merge-tree based store. A sorted sting table is divided into data blocks, where a sum of values of the keys in each data block is equal to or less than the maximum block size value. A piecewise linear approximation function is generated for the plurality of data blocks, where the maximum interpolation error of the piecewise linear approximation function is equal to or less than the model error value. The maximum block size value and the model error value are provided by the reinforcement learning agent. Following receipt of the lookup query request to find the target key, the system initiates a discovery operation to discover a data block among the data blocks and generates a search range for the discovered data block.

20 Claims, 12 Drawing Sheets

(56) References Cited

OTHER PUBLICATIONS

Abernethy et al., Lexicographic optimization: Algorithms and stability, In International Conference on Artificial Intelligence and Statistics (2024), PMLR, pp. 2503-2511.
Dong et al., Evolution of development priorities in key-value stores serving large-scale applications: The RocksDB experience, In 19th USENIX Conference on File and Storage Technologies (FAST 21) (Feb. 2021), USENIX Association, pp. 33-49.
Dai et al., From wisckey to bourbon: a learned index for log-structured merge trees. In Proceedings of the 14th USENIX Conference on Operating Systems Design and Implementation (USA, 2020), OSDI'20, USENIX Association.
Lu et al., Wisckey: Separating keys from values in ssd-conscious storage, ACM Transactions On Storage (TOS) 13, 1 (2017), pp. 1-28.
Leveldb: A Fast Persistent Key-Value Store, Jul. 27, 2011, retrieved from https://opensource.googleblog.com/2011/07/leveldb-fast-persistent-key-value-store.html on Nov. 27, 2024.
GITHUB, Bourbon: A Learned Index for Log-Structured Merge Trees, 2020, retrieved from https://github.com/edydfang/Bourbon on Nov. 27, 2024.
Lu et al., Tridentkv: A read-optimized Ism-tree based kv store via adaptive indexing and space-efficient partitioning, IEEE Transactions on Parallel and Distribute Systems 33, 8 (2022), 1953-1966.
GITHUB, Learned-RocksDB, 2021, retrieved from https://github.com/emperorlu/Learned-RocksDB on Nov. 27, 2024.
Wang et al., Leaderkv: Improving read performance of KV stores via learned index and decoupled KV table, In 40th IEEE International Conference on Data Engineering, ICDE 2024, Utrecht, The Netherlands, May 13-16, 2024 (2024), IEEE, pp. 29-41.

* cited by examiner

| Method | LSM-Based KV | Variable Key Size | Optimize Block Finding | Optimize Last-Mile Search Size | Optimize Block I/O | Optimize Key Comparison |
|---|---|---|---|---|---|---|
| DobLIX | ✓ | ✓ | ✓ | ✓ | ✓ | ✓ |
| LeaderKV [2024] | ✓ | ✗ | ✓ | ✗ | ✓ | ✗ |
| Bourbon [2021] | ✓ | ✗ | ✓ | ✗ | ✗ | ✗ |
| TridentKV [2021] | ✓ | ✗ | ✓ | ✗ | ✗ | ✗ |
| CN116382588A [2023] | ✓ | ✗ | ✗ | ✓ | ✗ | ✗ |
| CN117389950A [2024] | ✓ | ✗ | ✗ | ✓ | ✗ | ✗ |

FIG. 1

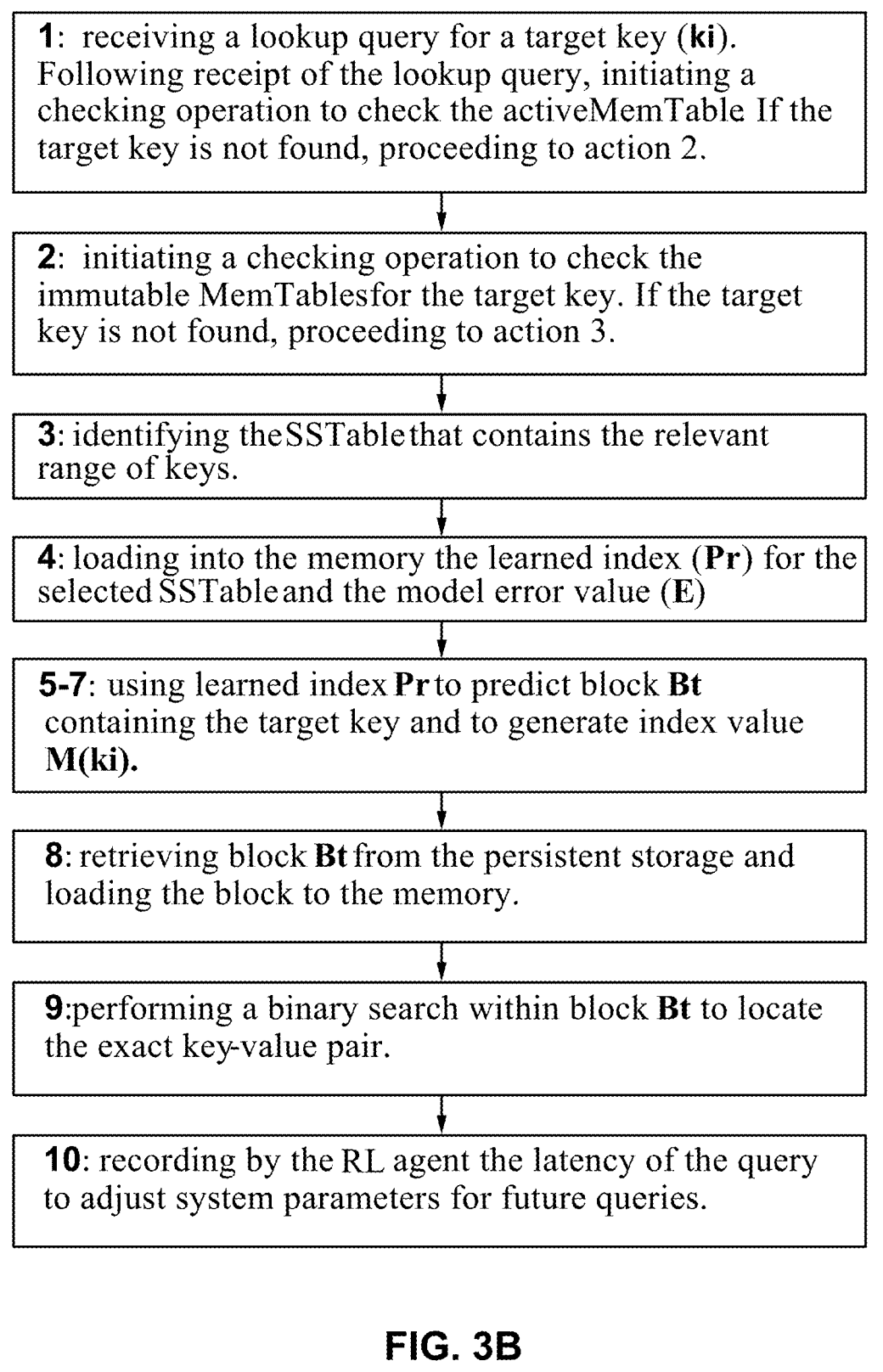

1: receiving a lookup query for a target key (ki). Following receipt of the lookup query, initiating a checking operation to check the activeMemTable If the target key is not found, proceeding to action 2.

↓

2: initiating a checking operation to check the immutable MemTablesfor the target key. If the target key is not found, proceeding to action 3.

↓

3: identifying theSSTablethat contains the relevant range of keys.

↓

4: loading into the memory the learned index (Pr) for the selected SSTableand the model error value (E)

↓

5-7: using learned index Pr to predict block Bt containing the target key and to generate index value M(ki).

↓

8: retrieving block Bt from the persistent storage and loading the block to the memory.

↓

9:performing a binary search within block Bt to locate the exact key-value pair.

↓

10: recording by the RL agent the latency of the query to adjust system parameters for future queries.

FIG. 3B

Dual-objective PLA

```
Input: Set of key-values D
Result: Radix Points R
E, B_max ← TuningAgent() ;
B_curr ← [ (k_0, v_0)];
R ← [ ] & index ← 0 ;
while (k, v) ∈ D do
    if |B_curr| > B_max then
        R ← R + [B_curr.last];
        B_curr ← [k,index];
    end
    if |B_curr| > 1 ^
     APE (Line(B_curr.first, (k,index)),B_curr) ≥ E
     then
        R ← R + [B_curr.last];
        B_curr ← [(k,index)];
    else
        B_curr ← B_curr + [(k,index)];
    end
    index ← index + 1;
end
R.append(B_curr.last);
```

Figure 4B:
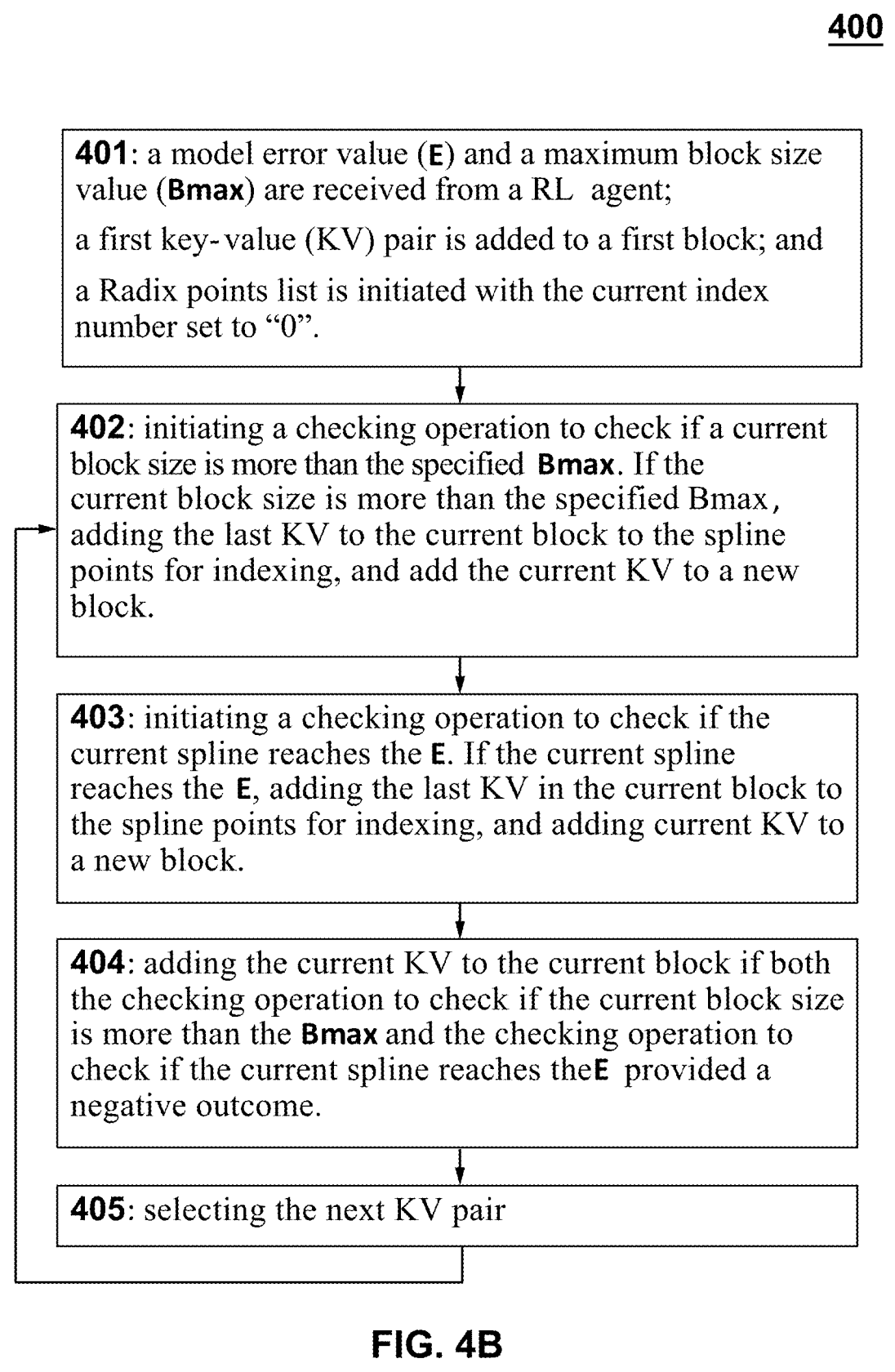

401: a model error value (E) and a maximum block size value (Bmax) are received from a RL agent;

a first key-value (KV) pair is added to a first block; and a Radix points list is initiated with the current index number set to "0".

402: initiating a checking operation to check if a current block size is more than the specified Bmax. If the current block size is more than the specified Bmax, adding the last KV to the current block to the spline points for indexing, and add the current KV to a new block.

403: initiating a checking operation to check if the current spline reaches the E. If the current spline reaches the E, adding the last KV in the current block to the spline points for indexing, and adding current KV to a new block.

404: adding the current KV to the current block if both the checking operation to check if the current block size is more than the Bmax and the checking operation to check if the current spline reaches theE provided a negative outcome.

405: selecting the next KV pair

Figure 6B:
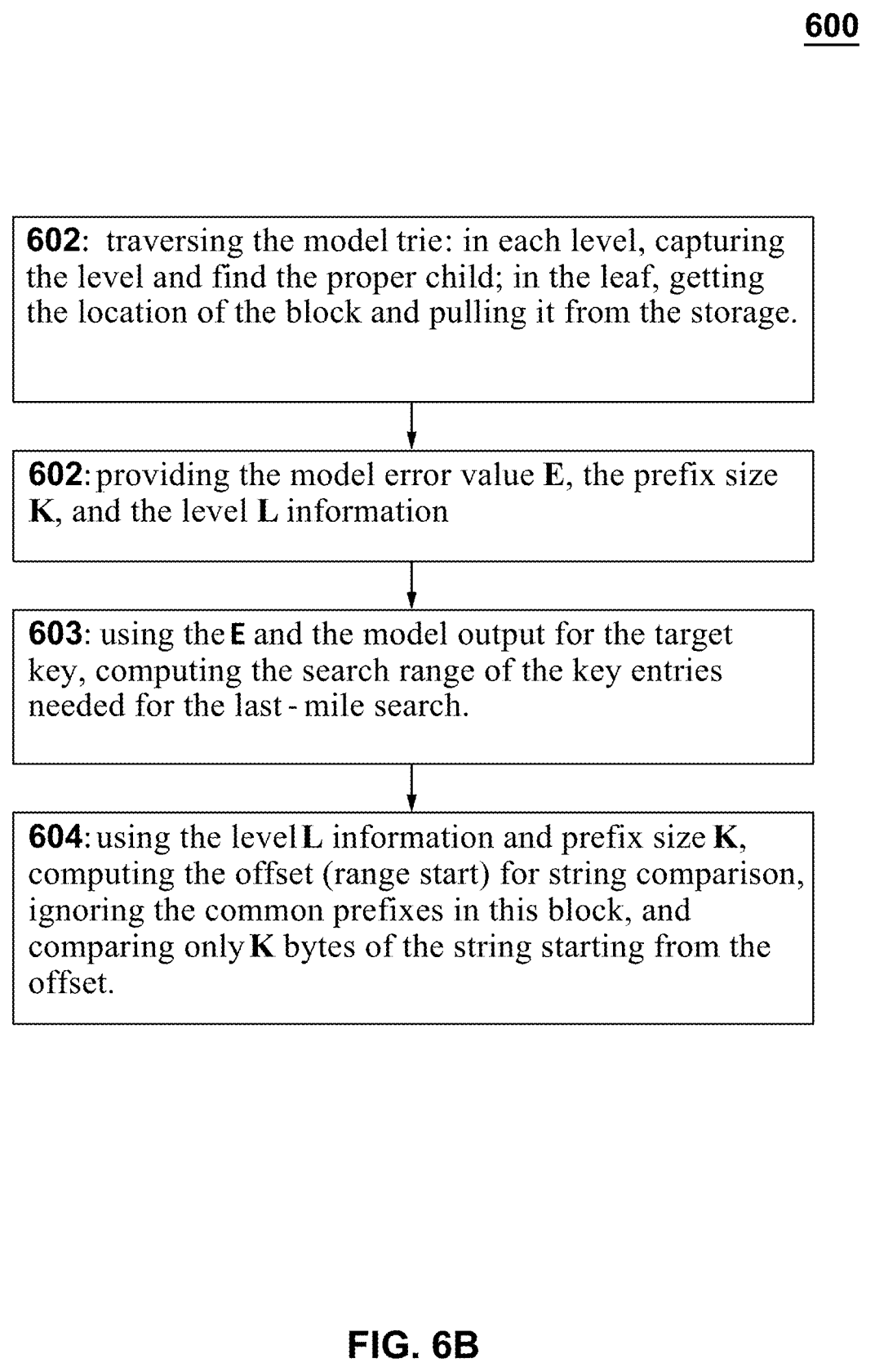

602: traversing the model trie: in each level, capturing the level and find the proper child; in the leaf, getting the location of the block and pulling it from the storage.

602: providing the model error value E, the prefix size K, and the level L information

603: using the E and the model output for the target key, computing the search range of the key entries needed for the last - mile search.

604: using the level L information and prefix size K, computing the offset (range start) for string comparison, ignoring the common prefixes in this block, and comparing only K bytes of the string starting from the offset.

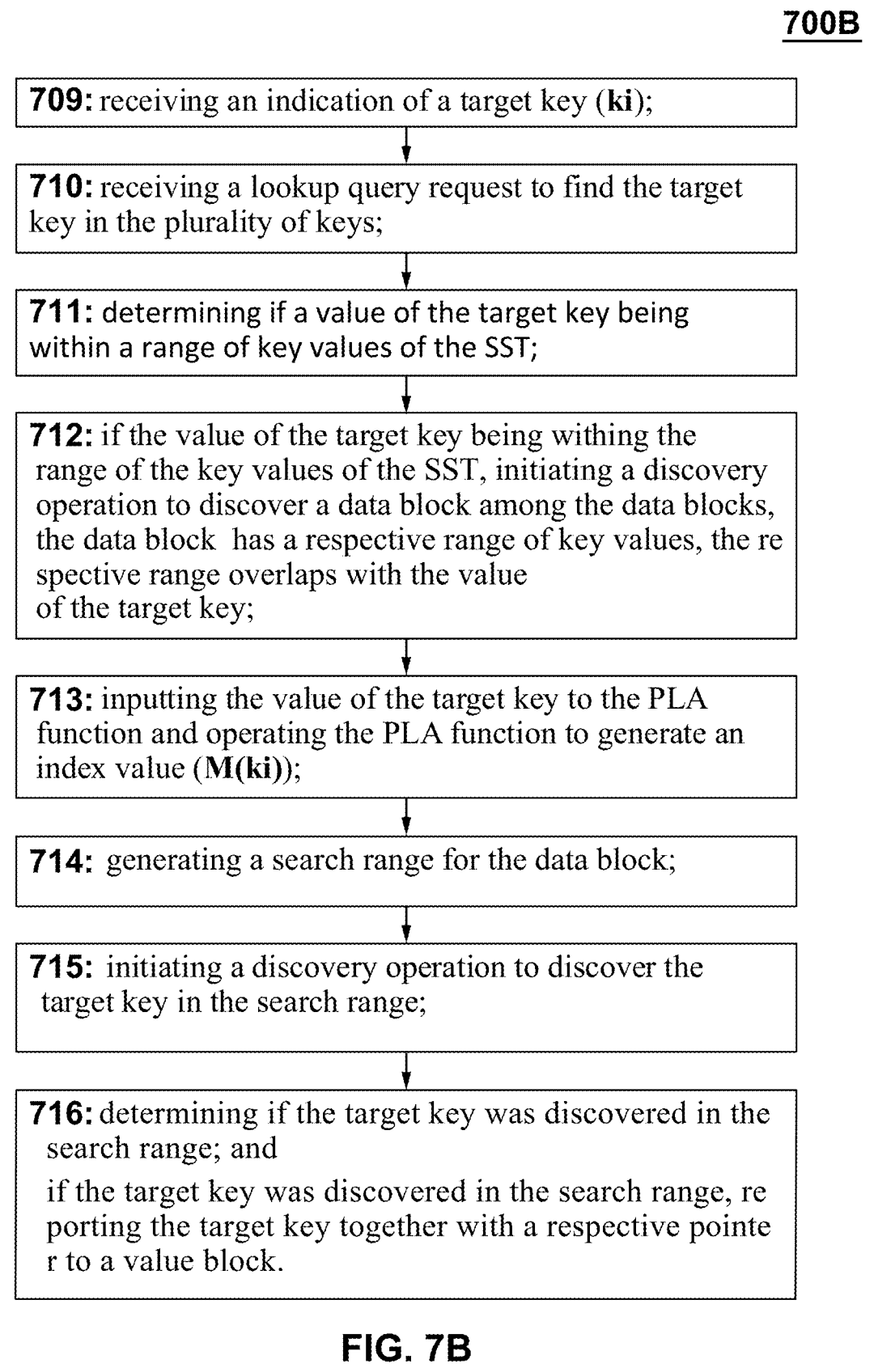

709: receiving an indication of a target key (ki);

710: receiving a lookup query request to find the target key in the plurality of keys;

711: determining if a value of the target key being within a range of key values of the SST;

712: if the value of the target key being withing the range of the key values of the SST, initiating a discovery operation to discover a data block among the data blocks, the data block has a respective range of key values, the re spective range overlaps with the value of the target key;

713: inputting the value of the target key to the PLA function and operating the PLA function to generate an index value (M(ki));

714: generating a search range for the data block;

715: initiating a discovery operation to discover the target key in the search range;

716: determining if the target key was discovered in the search range; and if the target key was discovered in the search range, re porting the target key together with a respective pointe r to a value block.

FIG. 7B

METHODS AND SYSTEMS FOR EFFICIENT LEARNED INDEX ON LOG-STRUCTURED MERGE-TREE KV-STORES

CROSS-REFERENCE TO RELATED APPLICATIONS

This is the first application filed for the present invention.

TECHNICAL FIELD

The present technology generally pertains to methods and systems for key-value stores and, in particular, to systems, devices, and methods to support dual objective learned indexing for log-structured merge tree-based stores.

BACKGROUND

This innovation is directed to a learned index system built on a log-structured merge-tree (LSM-Tree) of a key-value (KV) database. A KV database, or KV store, is a data storage paradigm designed for storing, retrieving, and managing associative arrays, and a data structure more commonly known today as a dictionary or hash table. Dictionaries may contain a collection of objects, or records, which in turn have many different fields within them, each containing data. These records are stored and retrieved using a key that uniquely identifies the record, and is used to find the data within the database. LSM-Tree is a disk-based data structure that is widely used in storage systems and databases to efficiently handle high write workloads. LSM-Trees are optimized for write-intensive workloads while still providing efficient read operations. Learned index requires some data properties on the raw data to be satisfied. A data management system may be modeled as a series of the mathematical operations. Machine learning (ML) may be applied to indexing of the data and creating a ML-based data structure.

A data structure in a memory may act as a write buffer and may be called a memtable. The memtable stores recently written data in a sorted order based on the keys. Write operations are first appended to the memtable, which allows for efficient sequential writes in memory. Once a memtable reaches a certain size or a threshold, it may be flushed to the disk as a sorted string table (SST). An SST is an immutable, sorted table stored on the disk. SSTs are typically stored in multiple files. Each file represents a separate level in the LSM-Tree. The SST tables are optimized for sequential reads. An SST my be divided into blocks of data. This refers to the data of the SST that can be stored in the same place in the same locality based on the size of the KVs that are stored in the system.

Learned indexes aim to enhance database retrieval efficiency via machine learning models that map keys to locations. These models may range from neural networks to simpler hierarchical ones. Learned indexes have historically used ensemble learning and hierarchical structuring. Neural networks based sophisticated models may require complex training and inferences. On the other hand, piecewise linear models, used to approximate the cumulative distribution function (CDF) for key prediction may be memory-efficient in comparison to traditional indexes. Despite their potential, recent studies show that learned indexes may not outperform traditional methods like, for example, B+tree based data storage in persistent memory settings. The primary issue is that learned indexes may not effectively utilize disk storage characteristics, resulting in multiple disk input and output (I/O) operations during the final search phase. This problem also affects learned indexing techniques applied to LSM-trees.

Learned index techniques are mainly focused on fixed-size keys, with limited attention to variable-length string keys. The Radix String Spline (RSS) method has made notable advancements by using a trie-based search. (A trie-based data structure is designed for quick reTRIEval of objects by string search.) RSS combines keys into manageable segments and computes a piecewise linear CDF model. However, RSS still faces inefficiencies in the last search stage, with most of its time consumed there, highlighting the need for further optimization in learned indexes for string keys.

Application of an LSM-tree storage engine in three different use cases at Meta: a structured query language (SQL) database, a distributed key-value store, and an artificial intelligence (AI)/ML services showed that keys and values may have variable sizes, with smaller standard deviations for keys and larger deviations for values. However, LSM-tree learned index solutions only support fixed key sizes, making them impractical for these use cases.

RocksDB is a high-performance embeddable key-value store method and may be used as a storage engine as disclosed by Dong, S. et al. "Evolution of development priorities in key-value stores serving large-scale applications: The RocksDB experience." 19th USENIX Conference on File and Storage Technologies (FAST 21) February 2021, USENIX Association, pp. 33-49. Some systems utilize RocksDB's default indexing mechanism. RocksDB uses LSM-Tree for indexing which is a combination of techniques to prorate the indexing load. It uses Bloom filter and data partitioning. This method called TableIndex in RocksDB.

LeaderKV is a read-optimized LSM-tree-based KV store as disclosed by WANG, Y., et al. "Leaderkv: Improving read performance of KV stores via learned index and decoupled KV table." In 40th IEEE International Conference on Data Engineering, ICDE 2024 May 13-16, pp. 29-41. LeaderKV employs decoupled KV tables (DK-Table) and efficient learned indexes for data retrieval. This approach disaggregates the keys from values and by storing the values separately, improve the performance of the read by removing the value size variance from the learned index model. FIG. 1 shows a table summarizing attributes of LeaderKV and some other LSM-tree-based KV stores.

WiscKey is a persistent LSM-tree-based key-value store with a performance-oriented data layout that separates keys from values to minimize I/O amplification. Bourbon is another key-value store with a learned index that optimizes lookups by understanding key distributions. Bourbon, based on Whisckey (a LevelDB variant) maintains fixed block sizes but may need to load multiple blocks as disclosed by DAI, Y., et al. "From wisckey to bourbon: a learned index for log-structured merge trees." Proceedings of the 14th USENIX Conference on Operating Systems Design and Implementation, OSDI 2020, USENIX Association, pp. 155-171.

TridentKV is a learned-index version of RocksDB designed to retrieve KV pairs by loading only a single data block as disclosed by LU, K., et al. "Tridentkv: A read-optimized lsm-tree based kv store via adaptive indexing and space-efficient partitioning." IEEE Transactions on Parallel and Distributed Systems 33, 8 (2022), pp. 1953-1966. TridentKV changes the data block sizes, which can sometimes lead to significantly larger blocks, affecting lookup performance when a large block is accessed. The open-source code for TridentKV is available, and it is built on top of RocksDB.

CN117389950A, published on 12 Jan. 2024, discloses a method to add learned index to each layer of the LSM and using recursive model index (RMI) to improve finding the file segments.

CN116382588A, published on 4 Jul. 2023, discloses a method to separates the data stored in the SST files based on their distribution for the complexity of their distributions, the design uses recursive method (e.g. RMI) and buffer data to arrange data for recursive model. Therefore, this method may handle the dynamic insertion with better performance.

While learned indexes in known solutions improve indexing efficiency, they often ignore the data access phase, leading to high latency during block retrieval. High latency is caused by multiple block read operations during the data access phase of learned indexes. Many solutions do not account for the need to optimize both the indexing and data access phases simultaneously. Most known solution use fixed block sizes, which can either result in inaccurate block predictions or larger-than-needed blocks, increasing I/O time and read latency. The final step in the lookup process, when the actual key-value pair is retrieved from the block, is often inefficient. Many solutions do not optimize this phase, leading to additional latency that negates the benefits of learned indexing.

Existing solutions are primarily designed for fixed-size keys, limiting their applicability in real-world scenarios where keys and values have variable lengths.

Therefore, improvements in methods and systems for efficient learned index on log-structured merge KV-stores are desirable.

SUMMARY

The present disclosure relates to methods, devices, and systems for efficient learned indexing in log-structured merge-tree KV-stores. According to embodiments of the present disclosure, there is provided a method of double-objective learned indexing in a log-structured merge-tree based key store. The method is executed by an electronic device The method comprises: providing a plurality of keys, generating a sorted string table (SST) by arranging key values of the plurality of keys in an ascending sequence, and indexing respective keys of the SST (using a count sequence of positive integers). Following receipt of a request, the method further comprises: requesting and receiving from a reinforcement learning (RL) agent a maximum block size value (Bmax) and a model error value (E), dividing the SST into data blocks (each data block includes one or more respective keys), generating a piecewise linear approximation (PLA) function, and storing the data blocks, the PLA function, and the E. In some embodiments the method, a sum of values of the one or more respective keys of the each data block being equal to or less than the Bmax. In some other embodiments of the method, a first key of a first data block being a first spline point of the first data block, a last key of the each data block being a spline point of the each data block, and the PLA function being built on the spline point of the each data block and the first spline point of the first data block. A maximum interpolation error of the PLA function being equal to or less than the E.

In some embodiments the method may include: receiving an indication of a target key, where the indication being based, at least in part, on a pointer, a realized data, or a combination thereof, receiving a lookup query request to find the target key in the plurality of keys, and determining if a value of the target key being within a range of key values of the SST. If the value of the target key being withing the range of the key values of the SST, a discovery operation to discover a data block among the data blocks is initiated. The method may further include inputting the value of the target key to a function and operating the function to generate a value (V) of a center of a search range, generating the search range for the data block, initiating a discovery operation to discover the target key in the search range, and determining if the target key was discovered in the search range. If the target key was discovered in the search range, reporting the target key together with a respective pointer to a value block.

In some embodiments of the method, the function may be the PLA function or a piecewise regression approximation (PRA) function. In some other embodiment, the data block has a respective range of key values, the respective range overlaps with the value of the target key, and/or the search range of the data block being defined between (the V−the E) and (the V+the E). In some embodiment of the disclosed method, the data blocks, the PLA function, and the E being stored in a persistent storage. In some embodiments, the disclosed method may further include: prior said initiating the discovery operation to discover the data block among the data blocks, retrieving a leaned index model from a persistent storage, and/or following the discovery operation to discover the data block among the data blocks, retrieving the data block from a persistent storage. In some embodiments of the method, the discovery operation to discover the target key being a binary search or a linear search. Some other embodiments may further include: prior said initiating the discovery operation to discover the target key, requesting and receiving from the RL agent an indication of a most significant bit. In some embodiments, the discovery operation to discover the target key may include: selecting an instant key in the search range and comparing each bit of a portion of a value of the instant key to respective bits of the value of the target key, and the portion of the value of the instant key is defined by a first bit and the most significant bit. Some embodiments of the method may include: recording by the RL agent a latency of the lookup query request and adjusts parameters for future lookup query requests.

Some embodiments disclosed in the instant application are directed to a storage system. The storage system being a log-structured merge-tree based storage system, and the disclosed storage system comprises an electronic device. The electronic device is configured to: provide a plurality of keys, generate a sorted string table (SST) by arranging key values of the plurality of keys in an ascending sequence, use a count sequence of positive integers to index respective keys of the SST, receive a request, request and receive from a reinforcement learning (RL) agent a maximum block size value (Bmax) and a model error value (E), divide the SST into data blocks (each data block includes one or more respective keys), generating a piecewise linear approximation (PLA) function, and store the data blocks, the PLA function, and the E.

In some embodiments of the storage system, the electronic device is further configured to: receive an indication of a target key, the indication being based, at least in part, on a pointer, a realized data, or a combination thereof, receive a lookup query request to find the target key in the plurality of keys, determine if a value of the target key being within a range of key values of the SST, if the value of the target key being withing the range of key values of the SST, initiating a discovery operation to discover a data block among the data blocks, input the value of the target key to a function and operating the function to generate a value (V)

of a center of a search range, generate the search range for the data block, initiate a discovery operation to discover the target key in the search range, determine if the target key was discovered in the search range, and if the target key was discovered in the search range, report the target key together with a respective pointer to a value block. In some embodiments of the system, the function being the PLA function or a piecewise regression approximation (PRA) function. In some other embodiments, a sum of values of the one or more respective keys of the each data block being equal to or less than the Bmax. In some embodiments of the disclosed system, a first key of a first data block being a first spline point of the first data block, a last key of the each data block being a spline point of the each data block, the PLA function being built on the spline point of the each data block and the first spline point of the first data block, and a maximum interpolation error of the PLA function is equal to or less than the E. In some other embodiments of the system, the search range of the data block being defined between (the V−the E) and (the V+the E).

In accordance with embodiments, the electronic device in a communication network includes a processor, a network interface and a memory and configured to perform one or more of the methods as described herein. In accordance with embodiments, there is provided a system of such electronic devices, networked together and configured to interact to perform one or more of the methods as described herein.

In accordance with an embodiment of the present disclosure, there is provided a computer program product including a (e.g. non-transitory) computer readable medium having statements and instructions stored thereon which, when executed by one or more computer processors, cause the computer processors to perform the method as set forth above. The computer processors may be parts of one or more electronic devices (e.g. network entities) as described herein.

Embodiments have been described above in conjunctions with aspects of the present invention upon which they can be implemented. Those skilled in the art will appreciate that embodiments may be implemented in conjunction with the aspect with which they are described but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

Implementations of the present technology each have at least one of the above-mentioned aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 1 shows a table summarizing attributes of LSM-tree-based KV stores.

FIG. 3B shows a flowchart of the representative example of the DobLIX method.

FIG. 4A illustrates a representative example of the dual-objective PLA in accordance with various non-limiting embodiments of the present disclosure.

FIG. 4B illustrates a flowchart of the representative example of the PLA.

FIG. 6B illustrates a flowchart of the representative example of the lookup process (the last-mile search).

FIG. 7B illustrates a flowchart of a representative example in accordance with certain non-limiting embodiments.

DETAILED DESCRIPTION

There are two primary methods to reduce the complexity of big data management. One method is Data Partitioning (Par(.)): divides big data D into smaller partitions. Another method is Indexing (I(.)): maps the query key directly to the target data in storage. To construct a comprehensive data pipeline for dataset D, a common strategy combines a sequence of $P=\{Par_1, Par_2, \ldots, Par_n\}$ and $I=\{I_1, I_2, \ldots, I_m\}$ in a specific order, denoted as $F=f_1(f_2(\ldots f_k(D)=f_1 \circ f_2 \circ f_k(D)$. Here is $f_i$ belongs to a partition P, and index i of $f_i$ is within the range [1:n]. Index i of $I_i$ is within the range [1:m]. In the context of an LSM-tree, the data is structured into four distinct partitions defined as $P_{LSM}=\{Par_{TreeLevel}, Par_{SST}, Par_{Block}, Par_{KV}\}$. Its respective indexing mechanism is represented by $I_{LSM}=\{I_{LevelBloomFilter}, I_{SST}, I_{BlockIndex}\}$. The composite function is articulated as $F_{LSM}=Par_{KV} \circ I_{BlockIndex} \circ Par_{Block} \circ Par_{SST} \circ I_{SST} \circ Par_{TreeLevel} \circ I_{LevelBloomFilter}(D)$. Breaking down $F_{LSM}$, initially, the given data D is partitioned into a hierarchical structure via tree levels ($Par_{TreeLevel}$), employing a level bloom filter ($I_{LevelBloomFilter}$) that generates a Boolean index indicating the presence of a key at a particular level. Within each level, data may be segregated into distinct SST files ($Par_{SST}$) with an index maintaining the key range within each SST, acting as the SST index ($I_{SST}$). Each SST arranges data in a sorted manner and is further divided into uniform blocks ($Par_{Block}$) containing key-value pairs ($Par_{KV}$). Additionally, each SST includes an index block in the SST metadata housing an index entry for each data block ($I_{BlockIndex}$).

Figure 2:
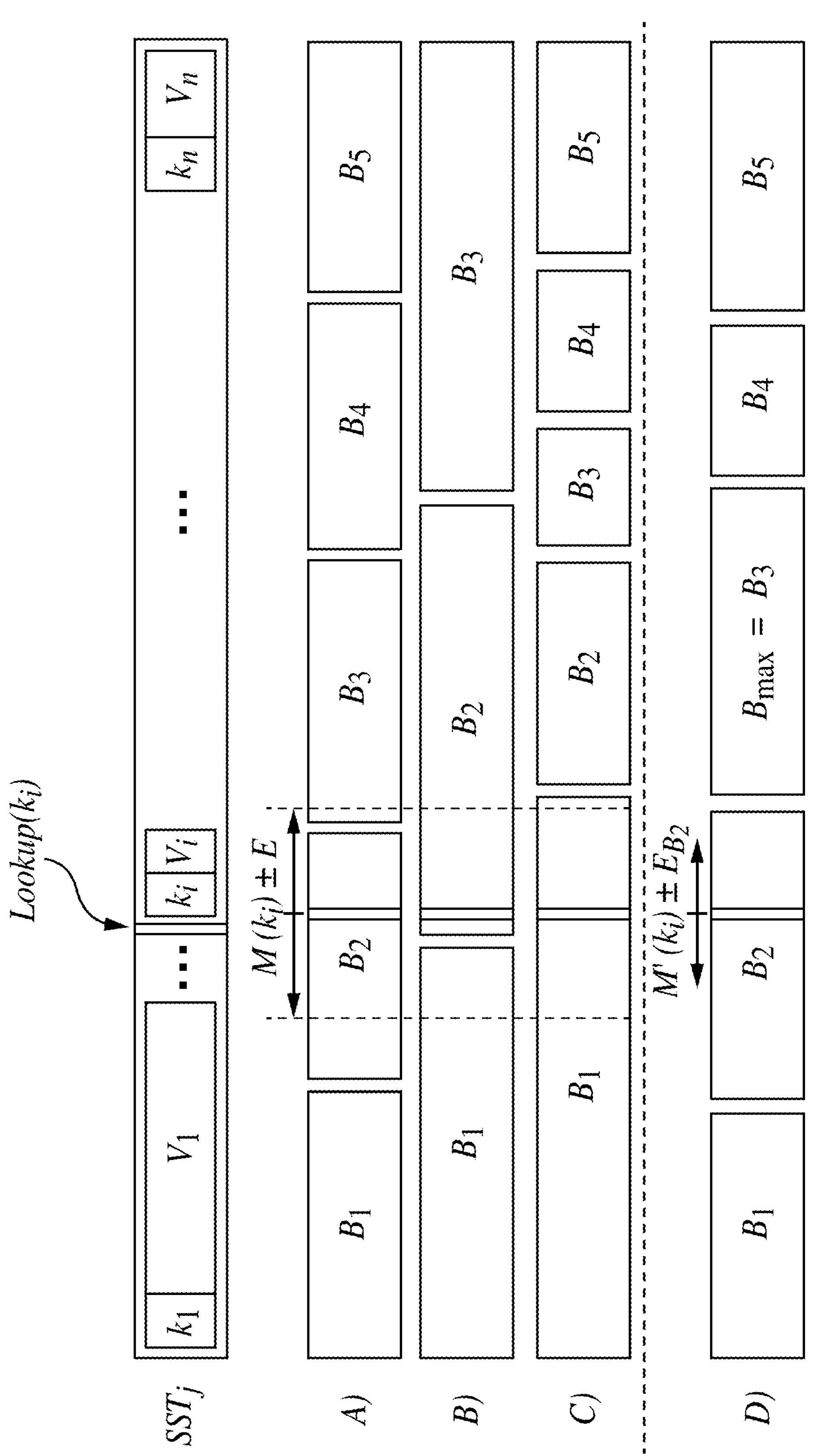
FIG. 2 illustrates representative examples of SSTs.

Enhancement of LSM-tree lookup performance through learned index integration is an aspect of the present disclosure. Tailored learned index solutions for LSM structures demonstrate significant gains in index retrieval efficiency. However, a notable limitation in these endeavors may be the data access overhead, particularly concerning the retrieval of blocks from storage to memory. FIG. 2 illustrates SST (A) with $B_1$, $B_2$, $B_3$, $B_4$, and $B_5$ blocks of equal sizes, and SST (B) with $B_1$, $B_2$, and $B_3$ blocks of equal sizes. SST (A) and SST (B) are optimized for read operations. However, adhering to fixed block sizes may result in inaccuracies in block lookup and necessitate accessing multiple blocks during read processes. FIG. 2 also shows SST (C) with $B_1$, $B_2$, $B_3$, $B_4$, and $B_5$ blocks, having variable sizes. It may lead to significantly larger blocks, thus increasing block I/O time. SST (C) exhibits this issue. These dilemmas arise from the isolated optimization of learned index models without considering the data access component. While tailoring SST block sizes may reduce average latency compared to LSM-Tree indexing, it may also manifest heightened tail-latency instances in scenarios necessitating the retrieval of multiple blocks or a large block. FIG. 2 also shows SST (D) with $B_1$-$B_5$ blocks. The size of each block of SST (D) is equal to or less than Bmax. Application of a double-objective learned index (DobLIX) method for LSM-tree-based KV stores, disclosed in the instant application, may guarantee to read only one block of SST (D), while the block size does not exceed the maximum block size Bmax.

DobLIX may optimize both the indexing phase and the data access phase. DobLIX may reduce read latencies by minimizing block retrievals. This method employs lexicographic optimization to ensure that the learned index model not only accurately predicts key locations but also minimizes block retrievals. (Lexicographic optimization of a multi-objective system to find the optimum values breaks down the problem into a sub-problem with one objective and consider the rest as non-negotiable paraments.) The disclosure introduces a learned index designed to handle real-world workloads with variable-sized keys using Radix String Spline (RSS) models. This approach may ensure that even for keys of varying lengths, the index can efficiently predict the block containing the target key-value pair. DobLIX may enhance the final step of the lookup process by adjusting the learned index model to narrow the search range within the block, improving the efficiency of the last-mile search. A reinforcement learning (RL) agent dynamically tunes the parameters of the learned index, such as the maximum allowed error and block size, to adapt to different workloads and datasets. DobLIX's core strengths in indexing and data access optimization ensure its long-term adaptability and relevance in the market.

The DobLIX architecture operates at the SST level, where DobLIX learns a model for each SST based on the distribution of key-value pairs. It then stores this model in the SST metadata, allowing it to be used during read operations to predict the relevant block for a given key. DobLIX is applicable in scenarios where high read performance is important. DobLIX is designed to be integrated into LSM-tree-based KV stores, such as RocksDB, LevelDB, or Cassandra for improved read performance. Cloud-based databases and storage systems may benefit from DobLIX's dual-objective optimization for faster data retrieval. Data-heavy AI and ML workflows that rely on fast data access from LSM-tree-based storage systems can implement DobLIX for reduced latency.

The system architecture includes an LSM-tree which is the underlying storage structure where SSTs are organized in a hierarchical manner. The system architecture further includes Learned Index Models: for each SST, DobLIX trains a model that predicts the block containing the target key based on the cumulative distribution function (CDF) of the keys. Some embodiments of the system may also include a Reinforcement Learning (RL) Agent. The RL agent continuously monitors the performance of the learned index and adjusts parameters to optimize indexing and data access. The RL agent may dynamically tune the parameters of the learned index, such as the maximum allowed error and block size, to adapt to different workloads and datasets, improving performance over time.

Figure 3A:
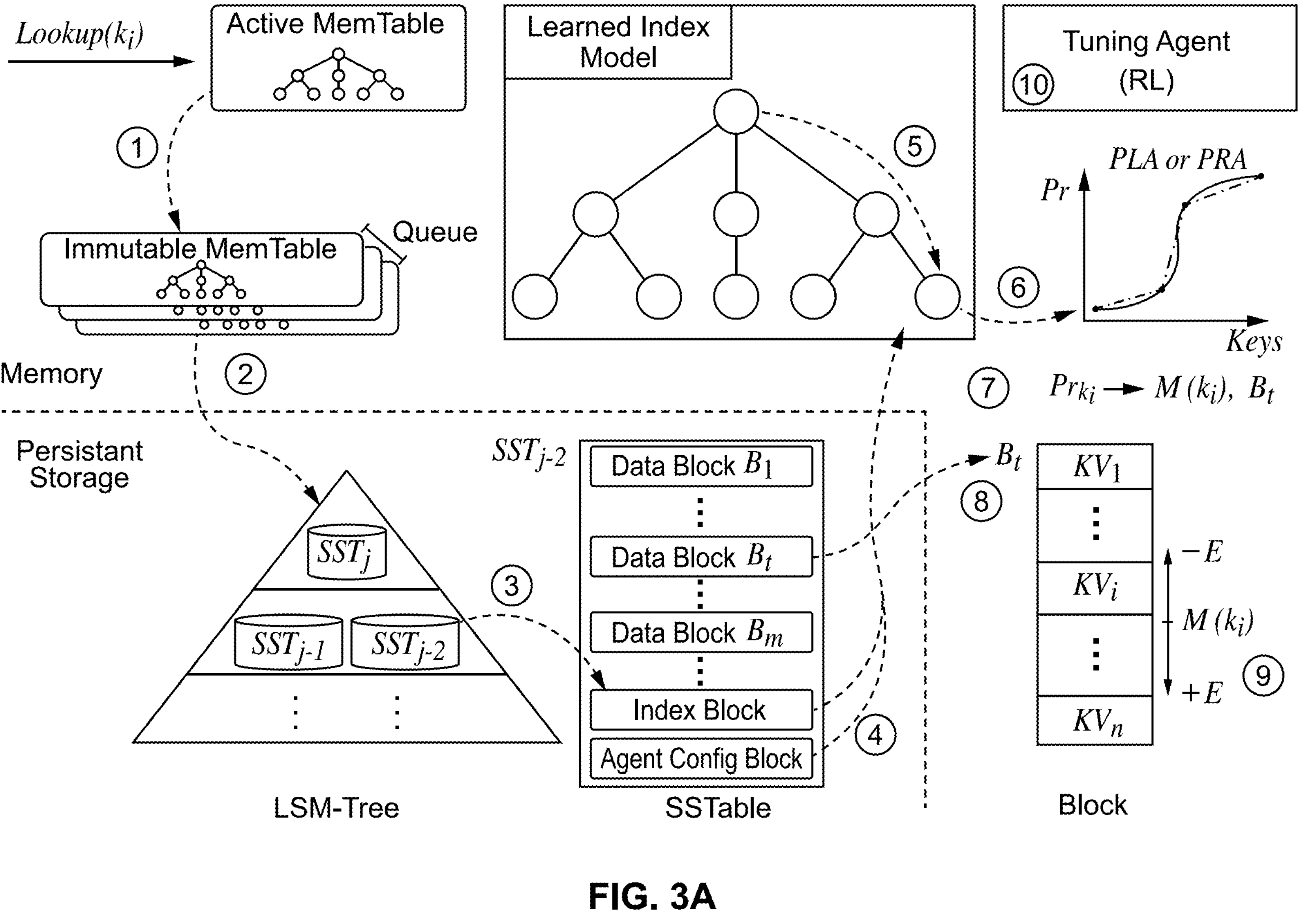
FIG. 3A illustrates a representative example of the DobLIX in the LSM-tree-based KV store in accordance with various non-limiting embodiments of the present disclosure.

FIG. 3A illustrates a representative example of the DobLIX method executed by a processor in the LSM-tree-based KV store in accordance with various non-limiting embodiments of the present disclosure. FIG. 3B shows a flowchart of the representative example of the DobLIX method.

At action 1, receiving a lookup query for a target key ($k_i$). Following receipt of the lookup query, initiating a checking operation to check the active MemTable. If the target key is not found, proceeding to action 2. At action 2, initiating a checking operation to check the immutable MemTables for the target key $k_i$. If the target key is not found, proceeding to action 3.

At action 3, identifying $SST_{j-2}$ that contains the relevant range of keys. At action 4, loading into the memory the learned index (Pr) for $SST_{j-2}$ and the model error value (E). At actions 5-7, using learned index Pr to predict block $B_t$ (only one read) containing the target key $k_i$ and to generate index value $M(k_i)$. At action 8, retrieving block $B_t$ from the persistent storage and loading the block to the memory. At action 9, performing a binary search within the block $B_t$ to locate the exact key-value pair. The search range is $M(k_i)-E$ to $M(k_i)+E$. At action 10, the RL agent records the latency of the query and adjusts system parameters for future queries.

The disclosed invention employs a machine learning-based index to optimize the lookup process. This optimization is a lexicographic optimization improving both the block indexing and the block reading I/O parts. Lexicographic optimization may provide a structured methodology for addressing multi-objective optimization problems by ranked and prioritizing objectives according to their significance. Initially, a highest priority objective is optimized; subsequent objectives are then tackled while maintaining a feasible set that respects previous optimizations. This sequential approach in the lexicographic optimization ensures that each objective is optimized in the order of importance and without altering the results, achieved earlier. By handling objectives one at a time within a clear hierarchical framework, lexicographic optimization facilitates decision-making. Lexicographic optimization may offer a deterministic solution for managing multiple objectives, which is particularly beneficial for essential goals in areas like resource allocation or scheduling. By ensuring critical objectives are met without compromise, lexicographic optimization allows secondary goals to be optimized within the remaining feasible solution space.

The learned index model may be trained to predict the location of a key within an SST by learning the cumulative distribution of the keys stored in the table. The learning process may use a Piecewise Linear Approximation (PLA) method. This method divides the key space into blocks and uses linear splines to estimate the position of keys within each block. The block and learned index generation is conducted in a way that guarantees that: (1) learned index result to read only one block, and (2) the block size do not exceed the maximum block size. FIG. 4A illustrates a representative example of the dual-objective PLA method, executed by a processor in accordance with various non-limiting embodiments of the present disclosure.

FIG. 4B illustrates a flowchart of the representative example of the PLA method 400. At action 401 a model error value (E) and a maximum block size value (Bmax) are received from a RL agent; a first key-value pair is added to a first block; and a Radix points list is initiated with the current index number set to "0". At action 402 initiating a checking operation to check if a current block size is more than the specified maximum block size. If the current block size is more than the specified Bmax, adding the last key-value to the current block to the spline points for indexing, and adding the current key to a new block. At action 403 initiating a checking operation to check if the current spline reaches the E, using a function that calculates the maximum distance (maximum interpolation) the points in the set can have from the given line. If the current spline reaches the E, adding the last key-value in the current block to the spline points for indexing, and adding current key to a new block.

At action 404, adding the current key-value to the current block if both the checking operation to check if the current block size is more than the Bmax and the checking operation to check if the current spline reaches the E provided a negative outcome. At action 405 selecting the next key-value pair and going back to action 402.

Figure 5:
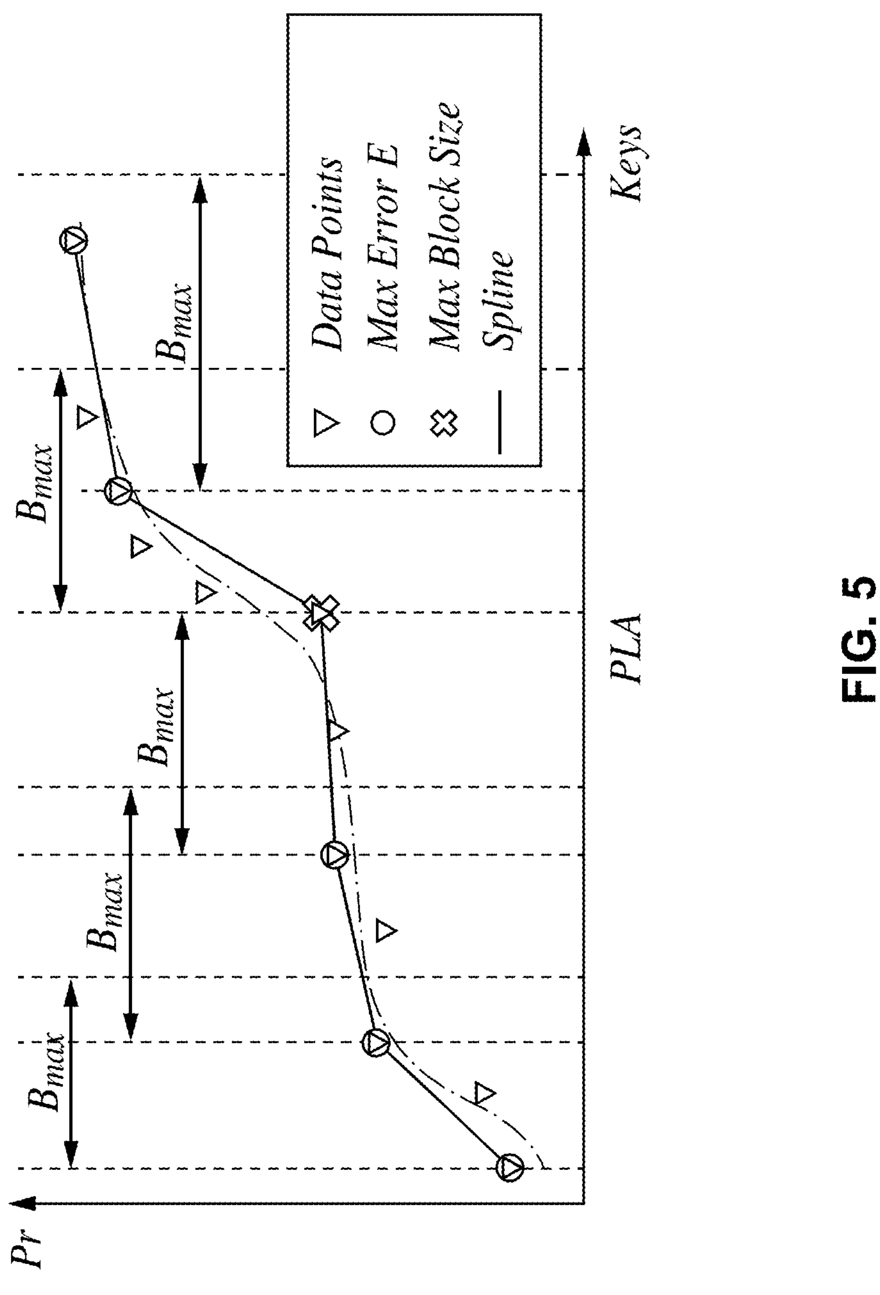
FIG. 5 illustrates a representative example of the PLA function Pr in accordance with various non-limiting embodiments of the present disclosure.

FIG. 5 illustrates a representative example of the PLA function Pr, executed by a processor in accordance with various non-limiting embodiments of the present disclosure. When the size of an added point exceeds the Bmax, a new block is created to maintain the optimal I/O performance of the previous block, as indicated by the cross in FIG. 5. This mechanism results in a new set of spline points, introducing new blocks when the secondary optimization criterion is met, in addition to the standard blocks formed by reaching the E.

Figure 6A:
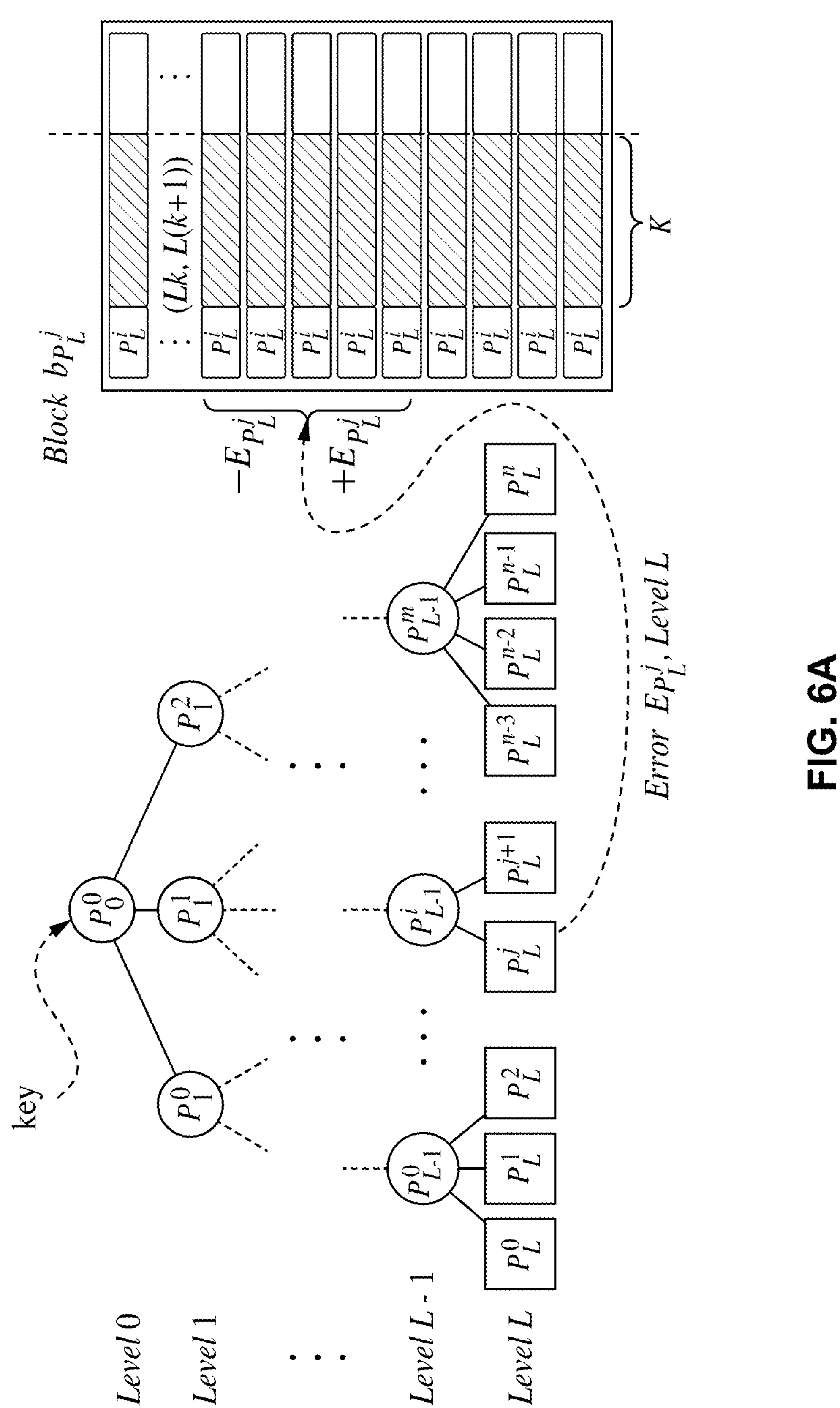
FIG. 6A illustrates a representative example of a lookup process (a last-mile search) in accordance with various non-limiting embodiments of the present disclosure.

After the learned index model retrieves the appropriate data block from storage, the system performs a last-mile search within the block to find the exact KV pair. FIG. 6A illustrates a representative example of a lookup process (a last-mile search) executed by a processor in accordance with various non-limiting embodiments of the present disclosure. The learned index provides a close approximation of the key's location, allowing the system to perform a binary search within a small range of KV pairs, and for string-based keys, the system compares only the significant portions of the key, reducing the overhead of full-key comparisons.

FIG. 6B illustrates a flowchart of the representative example of the lookup process (the last-mile search) 600. At action 601 traversing the model trie: in each level, capturing the level and find the proper child; in the leaf, getting the location of the block and pulling it from the storage. At action 602, providing the E, the value of the target key; and the level L information. At action 603, using the E and the model output for the target key, computing the search range of the key entries needed for the last-mile search. At action 604, using the level L information and prefix size K, computing the offset (range start) for string comparison, ignoring the common prefixes in this block, and comparing only K bytes of the string starting from the offset.

Figure 7A:
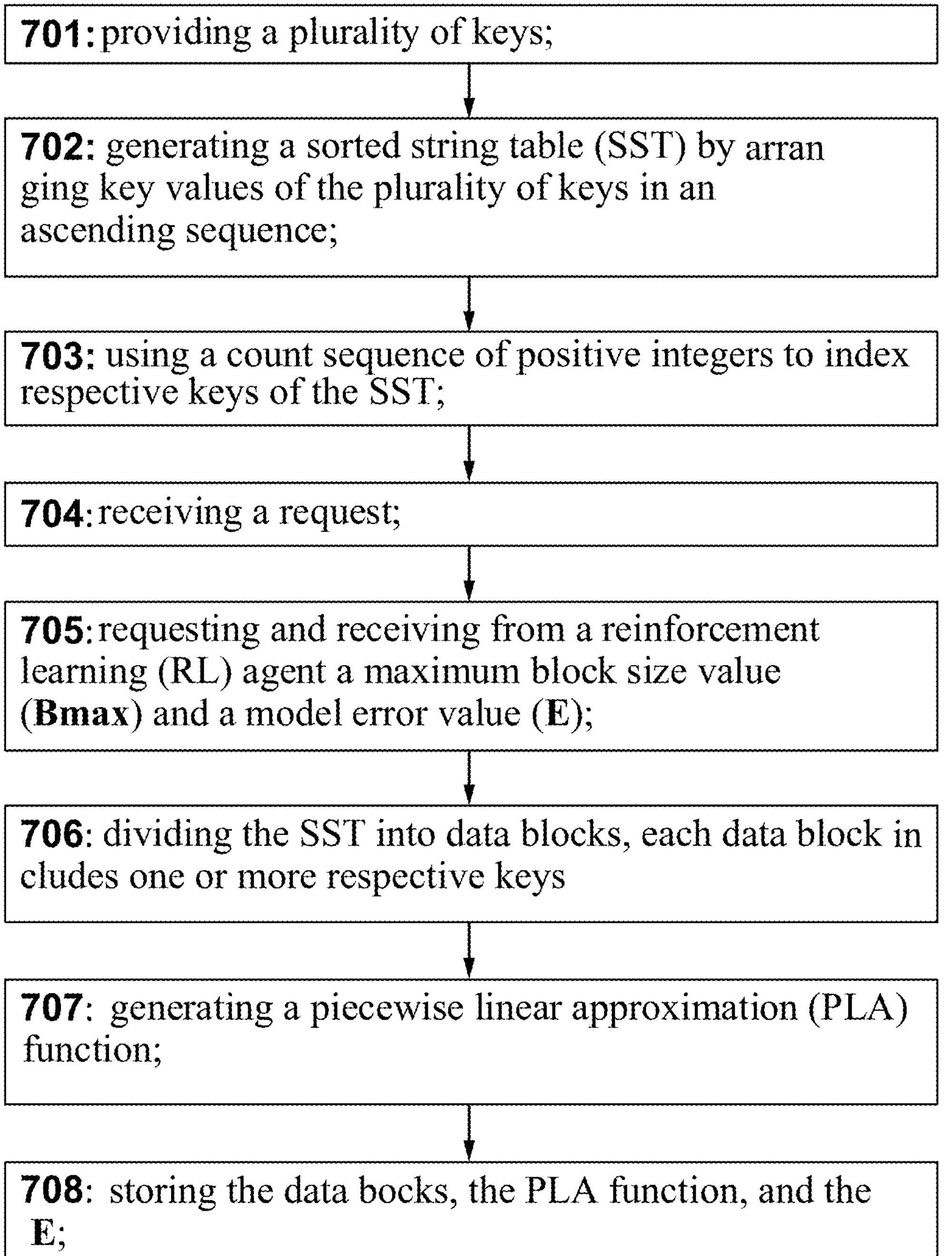
FIG. 7A illustrates a flowchart of a representative example of the DobLIX in accordance with certain non-limiting embodiments.

FIG. 7A illustrates a flowchart of representative example 700A of the DobLIX in accordance with certain non-limiting embodiments. At action 701, providing a plurality of keys. At action 702, generating a sorted string table (SST) by arranging key values of the plurality of keys in an ascending sequence. A SST may be also denoted as a sorted sequence of keys (SSK). At action 703, using a count sequence of positive integers to index respective keys of the SST. At action 704, receiving a request. Following receipt of the request, at Action 705, requesting and receiving from a reinforcement learning (RL) agent a maximum block size value (Bmax) and a model error value (E). At action 706, dividing the SST into data blocks, each data block includes one or more respective keys. A data block may be also denoted as a block-sequence. At action 707, generating a piecewise linear approximation (PLA) function. And at action 708, storing the bock-sequences, the PLA function, and the E.

FIG. 7B illustrates a flowchart of representative example 700B in accordance with certain non-limiting embodiments. At action 709, receiving an indication of a target key ($k_i$). At action 710, receiving a lookup query request to find the target key in the plurality of keys. At action 711, determining if a value of the target key being within a range of key values of the SST. At action 712, if the value of the target key being withing the range of the key values of the SST, initiating a discovery operation to discover a data block among the data blocks, the data block has a respective range of key values, the respective range overlaps with the value of the target key. At action 713, inputting the value of the target key to the PLA function and operating the PLA function to generate an index value ($M(k_i)$) which may be described as a value (V) of a center of a search range. At action 714, generating a search range for the data block. At action 715, initiating a discovery operation to discover the target key in the search range. At action 716: determining if the target key was discovered in the search range. If the target key was discovered in the search range, reporting the target key together with a respective pointer to a value block.

While the embodiments of the DobLIX, described above in the instant disclosure, are optimized for LSM-tree-based KV stores, other embodiments of the dual-objective learned index approach may be extended to other storage architectures such as B-trees or columnar databases. These systems may benefit from the dual optimization of indexing and data access phases, improving read performance in scenarios where data retrieval latency is a bottleneck. DobLIX, which efficiently handles variable-sized key-value pairs, may be adapted to manage other types of data, such as graph databases or document-oriented databases. These databases store complex, hierarchical data structures, and a learned index that adapts to varying data distributions may provide significant performance enhancements. In some other embodiments the RL agent used by DobLIX to fine-tune parameters may be further evolved to support more complex learning methods. By integrating more advanced models, such as deep learning-based predictors, respective versions of DobLIX may achieve even greater accuracy in predicting key locations, further reducing block access times and improving throughput.

Distributed databases, especially those used in large-scale cloud environments, may integrate DobLIX to enhance performance in data retrieval across multiple nodes. For instance, distributed KV stores may benefit from DobLIX's reinforcement learning-based tuning agent, which adjusts parameters dynamically based on workload characteristics. This may optimize both local and distributed data access, reducing latency in geographically distributed systems.

Figure 8:
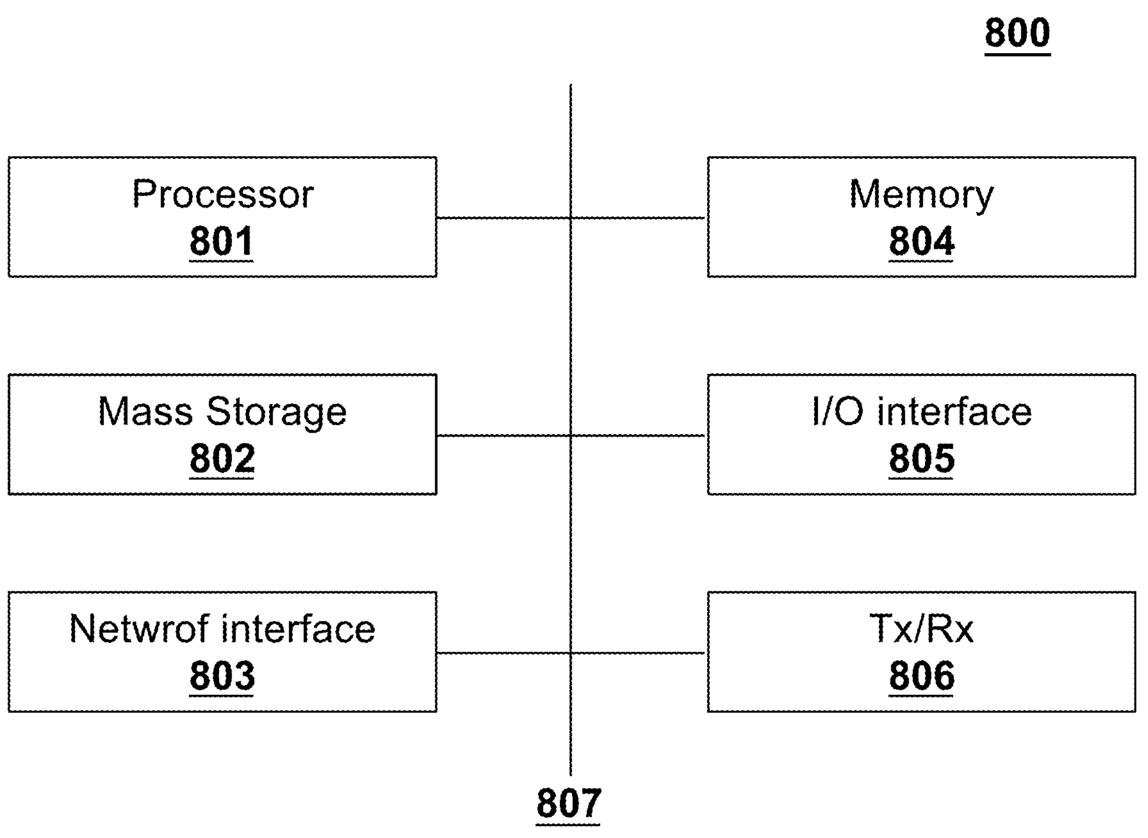
FIG. 8 illustrates an electronic device, configured to implement method operations in accordance with embodiments of the present disclosure.

FIG. 8 illustrates a block diagram of an electronic device 800 configured to executed the method operations of the present disclosure. Device 800 may wirelessly communicate with one or more other devices. Device 800 may comprise a computer processor operatively coupled to a computer memory. A computer equipped with network function including wireless transceiver may be configured as device 800. Device 800 may correspond to parts of a computer server, or a network node providing network access (e.g., an IEEE 802.11 access point (AP) or similar device), or a network node accessing a network, e.g. an IEEE 802.11 wireless station (STA). Device 800 may be wirelessly coupled to other devices via a wireless local area network (WLAN) such as an IEEE 802.11 compliant WLAN.

As shown in FIG. 8, device 800 includes a processor 801, such as a Central Processing Unit (CPU) or specialized processors such as a Graphics Processing Unit (GPU) or other such processor unit, memory 804, non-transitory mass storage 802, I/O interface 805, network interface 803, and wireless transceiver 806, all of which are communicatively coupled via bi-directional bus 807. Transceiver 806 includes one or multiple antennas. According to certain embodiments, any or all of the depicted elements may be utilized, or only a subset of the elements. Further, device 800 may contain multiple instances of certain elements, such as multiple processors, memories, or transceivers. Also, elements of the hardware device may be directly coupled to other elements without the bi-directional bus. Additionally or alternatively to a processor and a memory, other processing electronics, such as application specific integrated circuits, field programmable gate arrays, digital circuitry, analog circuitry, or the like, or a combination thereof may be employed for performing the required logical operations. Each integrated circuit may include one or more of semiconductor chips, and semiconductor chiplets.

Memory 804 may include any type of non-transitory memory such as static random access memory (SRAM), dynamic random access memory (DRAM), synchronous DRAM (SDRAM), read-only memory (ROM), any combination of such, or the like. Mass storage element 802 may include any type of non-transitory storage device, such as a solid state drive, hard disk drive, a magnetic disk drive, an optical disk drive, USB drive, or any computer program product configured to store data and machine executable program code. According to certain embodiments, memory 804 or mass storage 802 may have recorded thereon statements and instructions executable by the processor 801 for performing any of the aforementioned method operations described above.

It will be appreciated that, although specific embodiments of the technology have been described herein for purposes of illustration, various modifications may be made without departing from the scope of the technology. The specification and drawings are, accordingly, to be regarded simply as an illustration of the invention as defined by the appended claims, and are contemplated to cover any and all modifications, variations, combinations or equivalents that fall within the scope of the present invention. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Furthermore, each operation of the method may be executed on any computing device, such as a personal computer, server, PDA, or the like and pursuant to one or more, or a part of one or more, program elements, modules or objects generated from any programming language, such as C++, Java, or the like. In addition, each operation, or a file or object or the like implementing each said operation, may be executed by special purpose hardware or a circuit module designed for that purpose.

Through the descriptions of the preceding embodiments, the present invention may be implemented by using hardware only or by using software and a necessary universal hardware platform. Based on such understandings, the technical solution of the present invention may be embodied in the form of a software product. The software product may be stored in a non-volatile or non-transitory storage medium, which can be a compact disk read-only memory (CD-ROM), USB flash disk, or a removable hard disk. The software product includes a number of instructions that enable a computer device (personal computer, server, or network device) to execute the methods provided in the embodiments of the present invention. For example, such an execution may correspond to a simulation of the logical operations as described herein. The software product may additionally or alternatively include number of instructions that enable a computer device to execute operations for configuring or programming a digital logic apparatus in accordance with embodiments of the present invention.

Further aspects and examples of the present disclosure are presented in the Appendix (white paper "DobLIX: A Dual-Objective Learned Index for Log-Structured Merge Trees" by Alireza Heidarikhazaei, Amirhossein Ahmadi, and Wei Zhang) attached hereto, the entirety of which is hereby incorporated into the present disclosure. Modifications and improvements to the above-described implementations of the present technology may become apparent to the person skilled in the art. The foregoing description is intended to be exemplary rather than limiting.

What is claimed is:

1. A method of double-objective learned indexing in a log-structured merge-tree based key store, the method comprising, by an electronic device:

providing a plurality of keys;

generating a sorted string table (SST) by arranging key values of the plurality of keys in an ascending sequence, wherein a first key of a first block-sequence is a first spline point of the first block-sequence, wherein a last key of each block-sequence is a spline point of the each block-sequence;

using a count sequence of positive integers to index respective keys of the SST;

receiving a request;

requesting and receiving from a reinforcement learning (RL) agent a maximum block size value (Bmax) and a model error value (E);

dividing the SST into data blocks, each data block includes one or more respective keys;

generating a piecewise linear approximation (PLA) function, wherein the PLA function is built on the spline point of the each block-sequence and the first spline point of the first block-sequence; and storing the data blocks, the PLA function, and the E.

2. The method of claim 1, wherein a sum of values of the one or more respective keys of the each data block being equal to or less than the Bmax.

3. The method of claim 1, wherein a maximum interpolation error of the PLA function is equal to or less than the E.

4. The method of claim 1 further comprising:

receiving an indication of a target key, the indication being based, at least in part, on a pointer, a realized data, or a combination thereof;

receiving a lookup query request to find the target key in the plurality of keys;

determining if a value of the target key being within a range of key values of the SST;

if the value of the target key being withing the range of the key values of the SST, initiating a discovery operation to discover a data block among the data blocks;

inputting the value of the target key to a function and operating the function to generate a value (V) of a center of a search range;

generating the search range for the data block;

initiating a discovery operation to discover the target key in the search range;

determining if the target key was discovered in the search range; and if the target key was discovered in the search range, reporting the target key together with a respective pointer to a value block.

5. The method of claim 4 wherein the function being the PLA function or a piecewise regression approximation (PRA) function.

6. The method of claim 4, wherein the data block has a respective range of key values, the respective range overlaps with the value of the target key.

7. The method of claim 4, wherein the search range of the data block being defined between (the V−the E) and (the V+the E).

8. The method of claim 1, wherein the data blocks, the PLA function, and the E being stored in a persistent storage.

9. The method of claim 4 further comprising:

prior said initiating the discovery operation to discover the data block among the data blocks, retrieving a leaned index model from a persistent storage.

10. The method of claim 4 further comprising:

following the discovery operation to discover the data block among the data blocks, retrieving the data block from a persistent storage.

11. The method of claim 4, wherein the discovery operation to discover the target key being a binary search or a linear search.

12. The method of claim 4 further comprising:

prior said initiating the discovery operation to discover the target key, requesting and receiving from the RL agent an indication of a most significant bit.

13. The method of claim 12, wherein the discovery operation to discover the target key comprises: selecting an instant key in the search range and comparing each bit of a portion of a value of the instant key to respective bits of the value of the target key, and wherein the portion of the value of the instant key is defined by a first bit and the most significant bit.

14. The method of claim 4 further comprising:

recording by the RL agent a latency of the lookup query request and adjusts parameters for future lookup query requests.

15. A storage system, the storage system being a log-structured merge-tree based storage system, the storage system comprising an electronic device, wherein the electronic device configured to:

provide a plurality of keys;

generate a sorted string table (SST) by arranging key values of the plurality of keys in an ascending sequence, wherein a first key of a first data block is a first spline point of the first data block, wherein a last key of each data block is a spline point of the each data block;

use a count sequence of positive integers to index respective keys of the SST;

receive a request;

request and receive from a reinforcement learning (RL) agent a maximum block size value (Bmax) and a model error value (E);

divide the SST into data blocks, each data block includes one or more respective keys;

generate a piecewise linear approximation (PLA) function, wherein the PLA function is built on the spline point of the each data block and the first spline point of the first data block; and store the data blocks, the PLA function, and the E.

16. The storage system of claim 15, wherein the electronic device further configured to:

receive an indication of a target key, the indication being based, at least in part, on a pointer, a realized data, or a combination thereof;

receive a lookup query request to find the target key in the plurality of keys;

determine if a value of the target key being within a range of key values of the SST;

if the value of the target key being withing the range of key values of the SST, initiating a discovery operation to discover a data block among the data blocks;

input the value of the target key to a function and operating the function to generate a value (V) of a center of a search range;

generate the search range for the data block;

initiate a discovery operation to discover the target key in the search range;

determine if the target key was discovered in the search range; and if the target key was discovered in the search range, report the target key together with a respective pointer to a value block.

17. The storage system of claim 16, wherein the function being the PLA function or a piecewise regression approximation (PRA) function.

18. The storage system of claim 15, wherein a sum of values of the one or more respective keys of the each data block being equal to or less than the Bmax.

19. The storage system of claim 15, wherein a maximum interpolation error of the PLA function is equal to or less than the E.

20. The storage system of claim 16, wherein the search range of the data block being defined between (the V−the E) and (the V+the E).

* * * * *